United States Patent [19]

Jenkinson

[11] 4,318,225
[45] Mar. 9, 1982

[54] ANGLE MEASURING APPARATUS

[75] Inventor: Frederic W. Jenkinson, Salem, Oreg.

[73] Assignee: McHenry Systems, Inc., Donald, Oreg.

[21] Appl. No.: 100,032

[22] Filed: Dec. 4, 1979

[51] Int. Cl.³ .............................................. G01B 7/30
[52] U.S. Cl. .............................. 33/1 PT; 250/231 SE
[58] Field of Search .............. 33/1 PT, 125 C, 125 A; 250/231 SE

[56] References Cited

U.S. PATENT DOCUMENTS 3,116,886  1/1964  Kuehne ............................... 33/1 PT

FOREIGN PATENT DOCUMENTS

2643286  3/1978  Fed. Rep. of Germany ..... 33/1 PT
2016144  9/1979  United Kingdom ............... 33/1 PT Primary Examiner—William D. Martin, Jr.
Attorney, Agent, or Firm—Eugene D. Farley

[57] ABSTRACT

Angle measuring apparatus including a disc having a circular track of marks on one surface concentric with the disc, such disc being rotated about its axis. A mark sensor located adjacent the disc surface detects each mark and generates a signal as it passes thereby. A pair of angle-input means are located adjacent the disc for defining the angle to be measured. Reference means rotate with the disc and interact with each input-means to generate a reference signal each time the reference means passes thereby. Control circuitry counts the number of mark signals occurring between selected reference signals and from such count, the defined angle can be accurately computed.

10 Claims, 8 Drawing Figures

ANGLE MEASURING APPARATUS

BACKGROUND AND SUMMARY OF THE INVENTION

This invention pertains to an angle measuring device, and more particularly, to such a device characterized by a high degree of accuracy.

In the prior art, angle measuring devices, for example theodolites, have used primarily mechanical structure in order to measure angles. Some prior art apparatus have been constructed using both optical and magnetic records for generating a periodic signal or light pattern, the phase of which is used to compute an angle. Such prior art apparatus use frequency mixing to produce a phase signal indicating major divisions of mechanical rotation and for further resolution, produce a second phase signal further dividing the major divisions into a fixed number of smaller divisions. Such phase measurement methods do not provide apparatus which are as accurate as apparatus constructed in accordance with the instant invention.

Another problem affecting angle measuring apparatus in the prior art is that even in the most accurate of such instruments, the tolerances for machining rotating structure are insufficient to ensure angle measurement accuracy to within one second arc.

Yet another problem in prior art angle measuring apparatus, especially theodolites, relates to structure of the apparatus which provides a gravity-based reference for angle measurement. In the past, various types of pendulums and mercury arrangements have been used, such arrangements being very easily oscillated and, therefore, difficult to use. Damping systems provided in the past have limited the range over which the gravity-based reference can be used.

A general object of the present invention is to provide apparatus for measuring angles having a greater accuracy than such prior art apparatus by overcoming the above-mentioned problems.

According to a preferred embodiment of the invention, the proposed angle-measuring apparatus includes a circular disc having 21,600 equally-spaced magnetic marks encoded about the disc and concentric therewith. The disc is fixedly attached to a shaft that is rotated by an electric motor beneath the disc, such shaft extending above the top of the disc. Mounted on the shaft and extending at right angles therefrom over the disc are two sensors, each sensor including a photocell and light source aimed one toward the other. Two fixed posts are positioned opposite each other along an imaginary line drawn through the center of the disc, each post interrupting the light beam from one of the sensors each time it passes thereby. Two rotatable posts are positioned one opposite the other along an axis of rotation centered over, but independent of the shaft, each such rotatable post interrupting the light path of the other sensor each time it passes thereby. The angle defined for measurement is selected by positioning the rotatable posts so that the angle to be measured appears generally as an arc between one fixed post and one rotatable post with respect to the disc center. Since the rotatable posts are maintained substantially 180° apart, a pair of vertical angles is formed, the same angle appearing generally between the other fixed post and rotatable post.

A reference signal is generated each time a sensor interacts with each of its associated posts. A magnetic pickup is used to detect each mark on the disc. Control circuitry is provided to count the marks detected between selected reference signals. By counting the marks included within each opposing vertical angle and averaging those counts, errors in only one of such counts which are caused by small off-axis variations in the rotatable structures are eliminated. Also included within the control circuitry is resolving circuitry, such circuitry accurately generating a periodic waveform between each sensed mark in order to resolve further the measurement of the defined angle into seconds of arc.

In another embodiment of the invention, the disc is oriented in a vertical plane and, in lieu of the fixed posts, a tube in the form of an endless loop which is partially filled with fluid is provided for interaction with one of the sensors. A portion of the tube is restricted to provide damping of fluid movement within the tube. A gravity-formed meniscus occurs at each fluid surface. The sensor senses the meniscuses on both sides and in this manner, along with a pair of rotatable posts, another sensor and control circuitry as above described, vertical angles having a gravity-formed datum are measured.

Thus, a more specific object of the invention is to provide angle-measuring apparatus having improved accuracy by measuring the angle in such a manner as to average out errors caused by off-axis machining of rotatable structure in the apparatus.

Another specific object of the invention is to provide such increased accuracy by generating a periodic signal between major divisions of arc and counting the periods thereof to resolve further a measured angle.

Yet another more specific object of the invention is to provide increased accuracy in the measurement of vertical angles with respect to a gravity-formed datum.

These and other objects and advantages attained by the invention will become more fully apparent as the description which follows is read in conjunction with the accompanying drawings.

DETAILED DESCRIPTION OF A PREFERRED EMBODIMENT OF THE INVENTION

Figure 1:
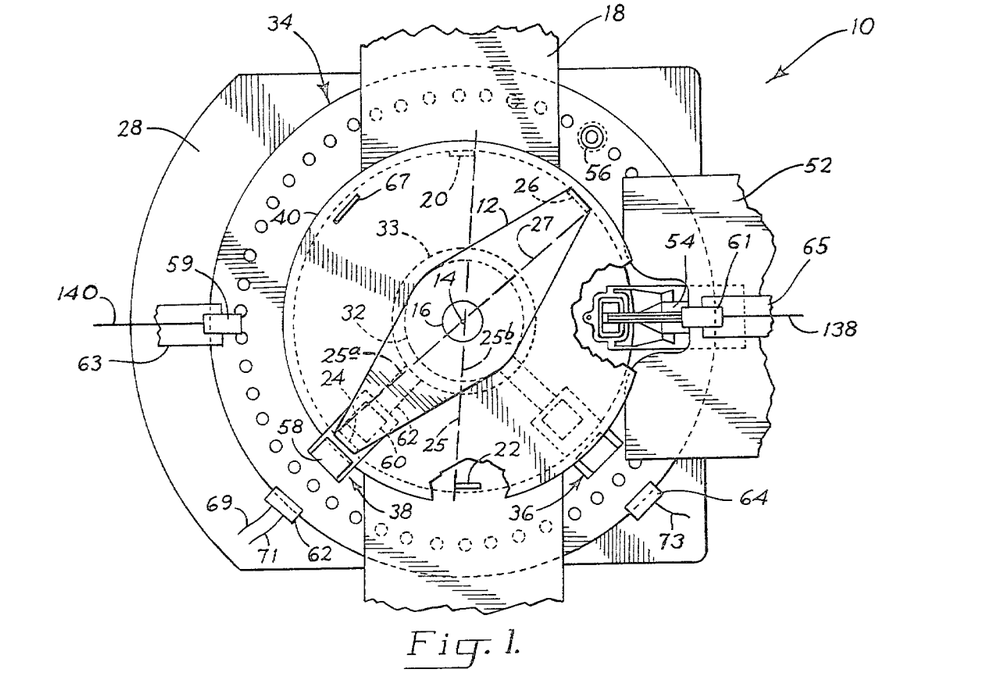
FIG. 1 is a plan view of the instant embodiment of the invention with portions thereof broken away.
Figure 2:
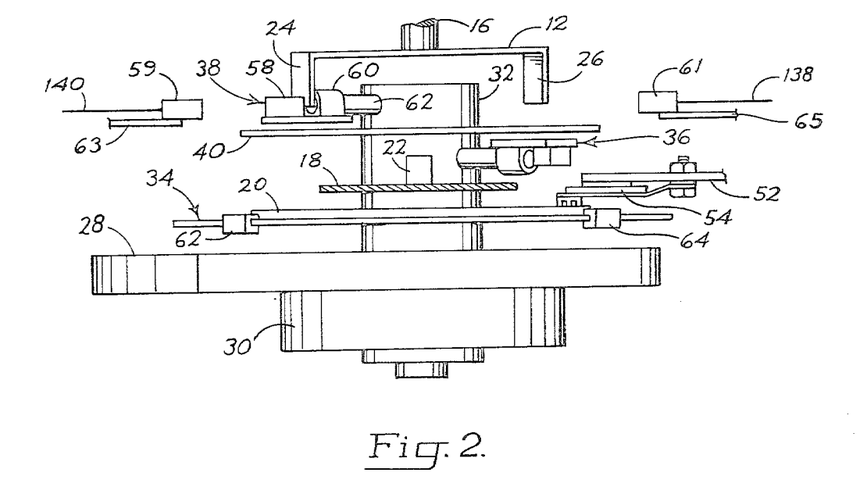
FIG. 2 is a side elevation of the view of FIG. 1.

Turning now to the drawings, and referring first to FIGS. 1 and 2, indicated generally at 10 is an angle-measuring apparatus constructed in accordance with the present invention. Apparatus 10 has been found to be particularly suited for use with a theodolite, although its use is not limited thereto. An angle to be measured is presented to the apparatus by positioning rotatable arm 12. Arm 12 rotates about its center 14 on shaft 16, shown partially in FIG. 2. A fixed platform 18, the ends of which are broken away in FIG. 1, supports a pair of fixed posts 20, 22. Two rotatable posts, 24, 26, are fixedly attached to both ends of arm 12, and can be rotated therewith. The angle presented to the apparatus for measurement is defined generally as the arc between fixed post 22 and rotatable post 24, such arc being measured with respect to center 14. The angle presented by the position of arm 12 in FIGS. 1 and 2 is angle 25 (having angle sides 25a, 25b), shown in dashed form. Actually, vertical angles are formed by positioning of arm 12, one such angle being angle 25, the other such being angle 27, also in dashed form. Posts 22, 24 are referred to herein as a pair of angle-input means, as are posts 20, 26.

Examination will now be made of the structure in apparatus 10 by which the angle presented thereto via posts 22, 24 is converted into a train of electronic pulses which represent an extremely accurate measurement of the arc of the angle so presented. Providing general support for the apparatus is base plate 28. Rotating means or electric motor 30 is secured to the lower side of plate 28. Extending upward from motor 30 through plate 28 is motor shaft 32. An opening 33 in platform 18 allows the motor shaft to pass therethrough. Fixed to shaft 32 and rotating therewith are disc assembly 34; rotating sensors 36, 38, also called reference means; or rotating sensor means; and electronics platform 40. By reason of their function herein, the reference means, or rotating sensor means, and angle-input means are called angle-to-signal conversion means.

Figure 3:
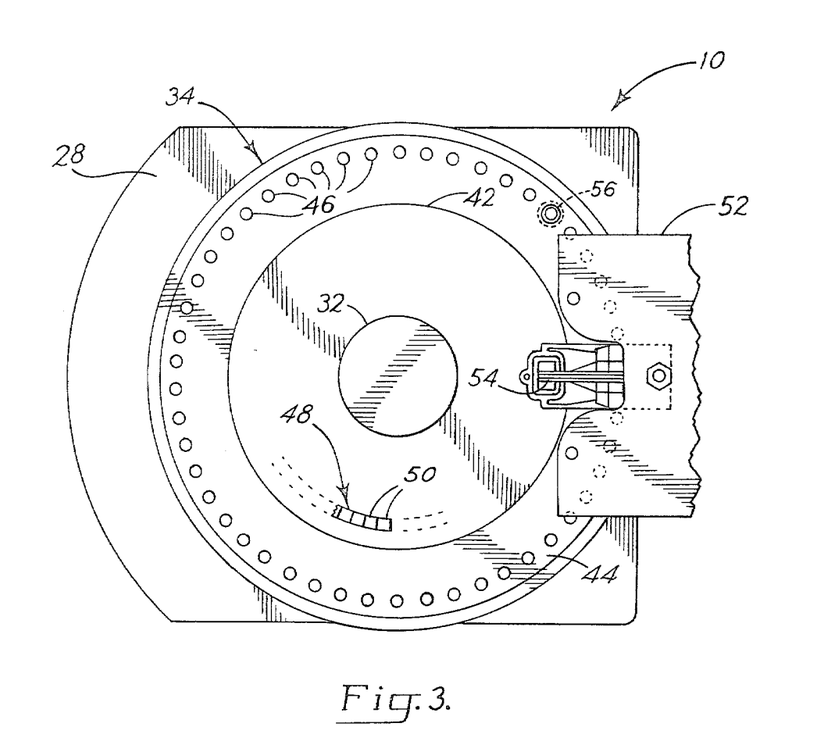
FIG. 3 is a plan view of part of the instant embodiment of the invention, other parts being removed.
Figure 4:
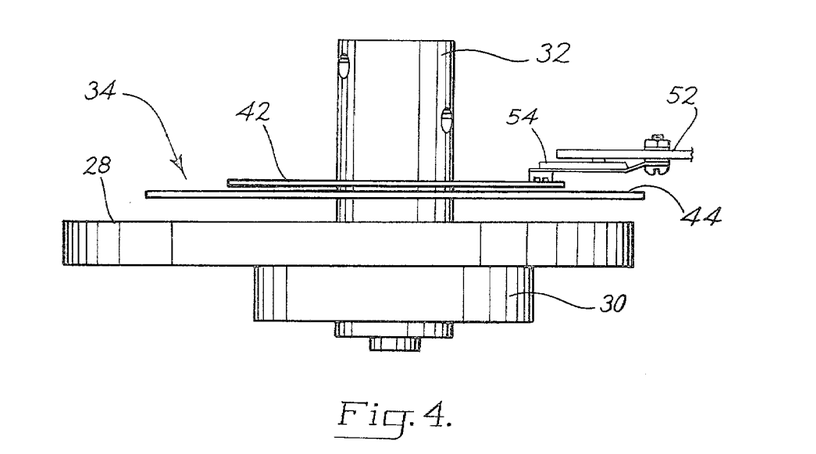
FIG. 4 is a side elevation of the view of FIG. 3.

For a better view of disc assembly 34, attention is directed to FIGS. 3 and 4 where apparatus 10 is shown in partially disassembled form, the following parts being removed therefrom: platform 18 and its associated posts 20, 22; sensors 36, 38; platform 40; and arm 12. Included within assembly 34 are disc 42, disc support 44, and detector 56. Plural equally-spaced circular holes 46 are located adjacent the circumference of the disc support and extend therethrough. Disc 42 and its support 44 each have a hole at the center thereof being of a size to accommodate shaft 32. Disc 42 is secured to support 44, such being attached to shaft 32 and rotatable therewith.

Disc 42 is formed of a material suitable to allow small portions thereof to be discretely magnetized in a conventional manner. A track 48 of such magnetized portions, each such portion being referred to herein as a mark, like mark 50, is formed in the disc, such track being concentric with the disc. In the instant embodiment of the invention, track 48 is composed of 21,600 equally spaced marks. It is to be appreciated that mark 50 within track 48 and the marks adjacent thereto are shown in a greatly enlarged form and only schematically, inasmuch as the actual marks are not visible to the human eye. The instant embodiment of the invention includes 21,600 of such marks and the spacing therebetween is obviously much, much less than that shown in illustrated track 48.

A magnetic pickup 54 is attached to a fixed support 52. Pickup 54 is positioned above disc 42 over track 48 and is constructed in a well-known manner so as to generate a signal each time a mark, line mark 50, passes thereby, such signal being referred to herein as a mark signal. In the course of one revolution of disc 42, pickup 54 generates 21,600 mark signals. Detector 56 interacts, in a conventional manner, with holes 46 to provide a feedback signal indicative of the rotational speed of assembly 34, such signal being used to control the speed of motor 30 in a manner which will later be described. Included within the detector are a light source and a photocell each oriented one toward the other with disc support 44 passing therebetween. The detector is positioned to allow holes 46 to pass thereby as the disc assembly rotates. As such rotation occurs, a periodic signal consisting of high and low voltage levels is developed by the detector, the frequency of such signal being proportional to the speed of revolution of disc assembly 34.

Returning again to FIGS. 1 and 2, examination will now be made of the structure of sensors 36, 38, and of the interaction of each sensor with its associated posts. Included within sensor 38 is a photocell 58 and a light source 60, each of which is mounted toward the outer end of a shaft 62. Shaft 62 is anchored to motor shaft 32 and rotates therewith. The detecting surface of photocell 58 is directed toward post 24. Light source 60 is likewise directed toward the post and, therefore, toward the detecting surface of the photocell. In the configuration shown in FIGS. 1 and 2, post 24 is blocking the light source from the photocell. When post 24 is not positioned between photocell 58 and light source 60, the light from the source strikes the photocell. Thus, the output of photocell 58 is an indication of the presence or absence of a post between source 60 and photocell 58. Post 26 at the opposing end of arm 12 likewise interacts with sensor 38.

Sensor 36 is secured to motor shaft 32 below, and approximately 90° around, the shaft from sensor 38. The photocell and light source associated with sensor 36 are oriented so as to interact with posts 20, 22 in a manner similar to the interaction of sensor 38 with its associated posts. As will later be described in more detail, during the operation of apparatus 10, the sensors are rotating about center 14 under the power of the electric motor. As each sensor approaches one of its associated posts, the photocell therein is indicating that light is present on its detecting surface. When the post is first interposed between the photocell and its opposing light source, the signal generated by the photocell changes from a voltage level indicating the presence of light to one indicating the absence of light. This change of voltage levels is referred to herein as a reference signal. As will later be described, such reference signal is utilized by the control circuitry.

Electronics platform 40 is provided for electronics which are mounted thereon, such electronics being provided to detect and shape the reference signal. The electronics so provided are a part of what is referred to herein as control circuitry. The electronics which perform such functions with the reference signals are not shown in the drawings in order to increase the clarity of the latter. Lights 59, 61 are positioned fixedly on supports, 63, 65, shown partially broken away in FIG. 1. Lights 59, 61, under control of control circuitry not on platform 40, interact with a photocell 67 on the electronics platform in a manner and for purposes to be described later.

Finishing now the description of the structure appearing in FIGS. 1 and 2, located at the circumference of disc assembly 34 are two sets of electrical brushes 62, 64. Conductors (not shown) interconnect platform 40 with brushes 62, 64. Brushes 62 provide power to the above-mentioned electronics on platform 40. Conductors 69, 71 connect brushes 62 to a conventional power supply (not shown). Likewise, brushes 64 are provided to conduct signals generated by such electronics off of the rotating portion of apparatus 10 to control circuitry (not shown in FIG. 1 or 2) on conductor 73, such signals and circuitry to be later described herein.

Figure 5:
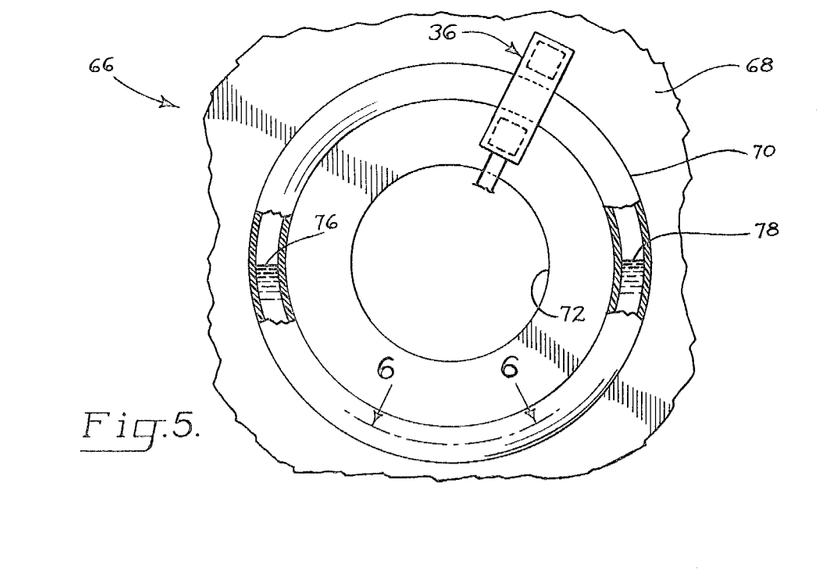
FIG. 5 is a side elevation of an endless loop which is used to provide a gravity-formed datum in another embodiment of the invention.
Figure 6:
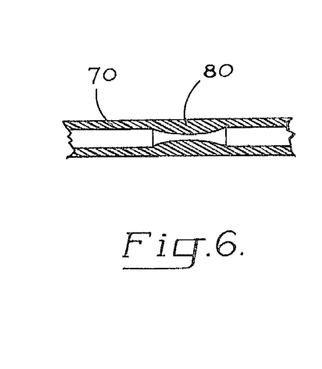
FIG. 6 is a view taken generally along line 6—6 in FIG. 5.

Directing attention now to FIGS. 5 and 6, a portion of another embodiment of the invention is illustrated therein. The portion shown in FIGS. 5 and 6 is intended for use with substantially the rest of the apparatus shown in FIGS. 1 and 2 in order to measure vertical angles with respect to a gravity-based datum. Assume for the moment that the embodiment illustrated in FIG. 1 is positioned so that disc assembly 34 is in a vertical plane. Also assume that platform 18 and its associated posts 20, 22 are not present. In place thereof is the tube assembly indicated generally at 66 in FIG. 5. Included within assembly 66 is a support plate 68, and a tube 70 in the form of an endless loop mounted on plate 68. A hole 72 appears at the center of tube 70, in plate 68, this being to allow assembly 66 to be positioned in the same plane occupied by platform 18 in the first embodiment of the invention. Hole 72 receives motor shaft 32.

Sensor 36 alone is shown in FIG. 5 to indicate the interaction that it has with tube 70 when assembly 66 is utilized as above-described. Tube 70 is interposed between the photocell and light source of sensor 36. The tube is in the form of an endless loop, and is substantially half filled with liquid, such liquid, under the force of gravity, forming meniscuses 76, 78. Tube 70 is light pervious, and the sensor which interacts therewith is able to detect whether or not fluid is present within the portion of the tube over which the sensor is positioned. When the sensor is rotating, and passes by either meniscus, the amount of light transmitted to the photocell changes, thus generating a signal. Such signal is referred to herein as a reference signal.

A restriction 80 is formed at the bottom of the tube in order to provide damping of the fluid to prevent prolonged oscillation thereof whenever tube 70 is moved. Restriction 80 prevents rapid movement of the fluid therethrough, thus generating the damping effect.

Figure 7:
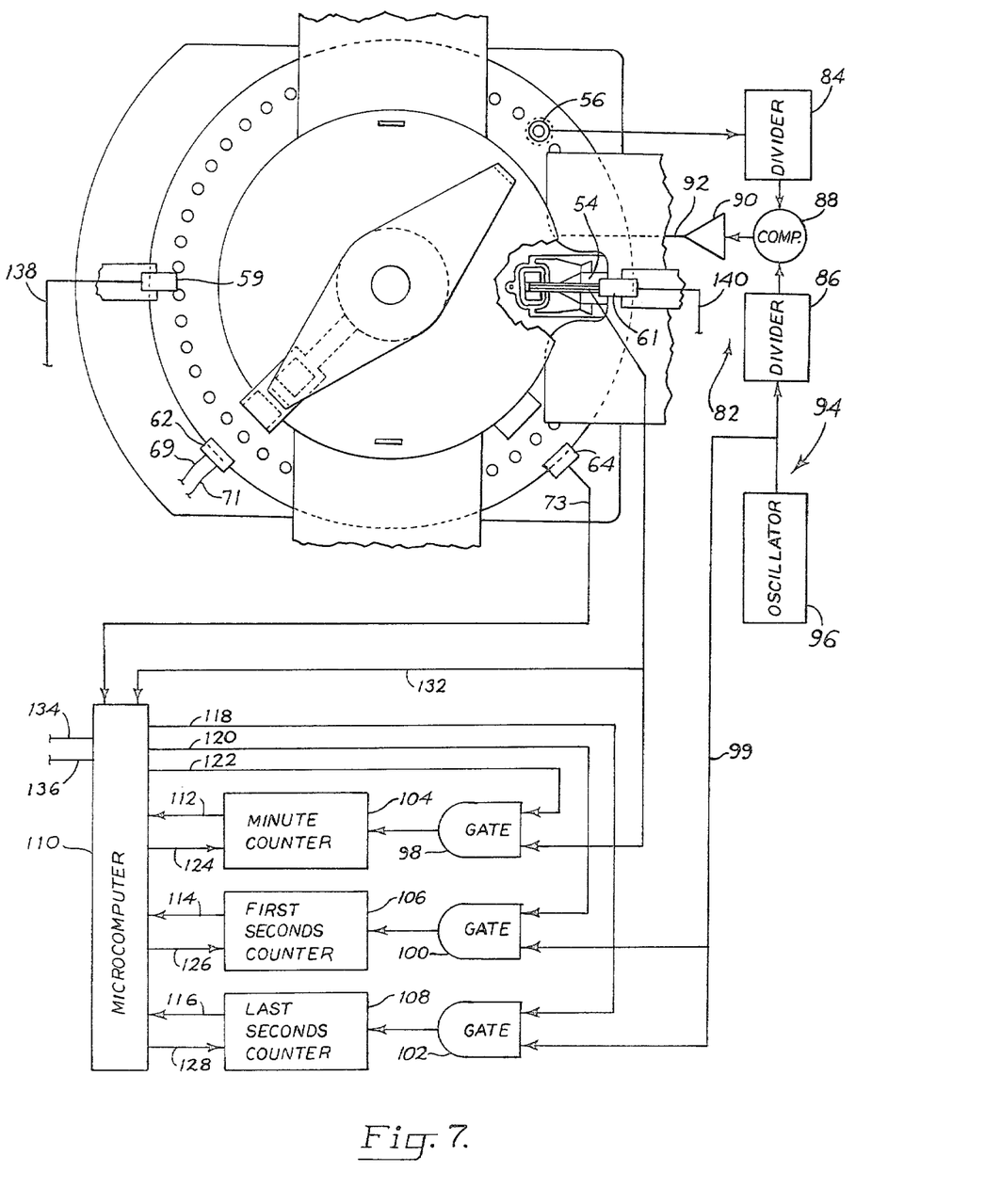
FIG. 7 is a schematic diagram of the servo control means and control circuitry interconnected with one embodiment of the invention.

Illustrated in FIG. 7 is a schematic diagram including both the control circuitry and servo-control means. Also illustrated in FIG. 7 is the interconnection of the control circuitry and servo-control means with previously described structure in apparatus 10. It is to be appreciated that the components appearing schematically in FIG. 7 require attachment to a conventional power supply in order to operate properly. Such supply and attachments have been omitted in FIG. 7 so that the schematic can be more easily read.

Illustrated generally at 82 is servo-control means. Included therein are dividers 84, 86, comparator 88, and amplifier 90. Dividers 84, 86 each have one input and one output, the same being shown by arrows pointing into each divider, such arrow representing an input, and arrows pointing out of each divider, such representing an output. Each divider is of a kind wherein, when a periodic input signal is applied to the input, a periodic output signal appears on the output, such signal being of a lower frequency than the input signal. The amount by which the frequency is lowered depends upon selection of components in the construction of the divider.

Comparator 88 has two inputs, such being illustrated by arrows directed toward the comparator and one output, illustrated by an arrow pointing outwardly from the comparator. Comparator 88 is of conventional construction, and is of a kind which, when periodic signals are applied to each of its inputs, can compare the frequencies of each such signal. The comparator develops a DC output voltage which appears on its output, such voltage being proportional to the magnitude of the difference between the frequencies of the signals appearing on its inputs. The greater the difference in such frequencies, the greater the level of the DC output voltage generated by the comparator.

Amplifier 90 is a conventional DC amplifier having one input, such being the output of comparator 88 and one output, such applied to conductor 92. Conductor 92 is connected to the DC input of motor 30. Amplifier 90 is constructed so that when no input is provided to the amplifier, the output provides a signal which drives motor 30 at approximately 7.7 revolutions per second. When a signal appears at the input of amplifier 90, the voltage appearing on conductor 92 varies, and accordingly, varies the speed of motor 30.

Appearing generally at 94, is a portion of what is referred to herein as control circuitry. As will be recalled, another portion of the control circuitry, to be discussed later, is positioned on electronics platform 40 and is not illustrated herein. Included within control circuitry 94 is an oscillator 96, gates 98, 100, 102, counters 104, 106, 108, and microcomputer 110. In the instant embodiment of the invention, the just-mentioned elements of circuitry 94 are digital in nature, that is, they are constructed to operate with voltages having one of two levels. Such levels will be referred to herein as either a "1" or a "0" level or a high or a low level, respectively.

Oscillator 96 is of conventional construction and produces a periodic output signal on its single output terminal. This output signal changes from a low to a high voltage level at a frequency of 10,000,000 Hz. Such signal is applied to both divider 86 and gates 100, 102.

Gates 98, 100, 102 are conventionally constructed gates, known as "and" gates each of which has two inputs and one output. As illustrated herein, the input terminals are illustrated with interconnections having arrows pointing into each gate. The output terminals of gates 98, 100, 102 are connected to the counting input terminals in counters 104, 106, 108, respectively. Each of gates 98, 100, 102 operates in the following manner: whenever a "1" voltage level appears on each of the two inputs, a "1" voltage level appears at the output terminal. If a "0" level occurs on either of the two inputs, the output terminal will also be at a "0" level. Accordingly, "0" levels at both input terminals produces a "0" level at the output terminal. Each gate receives one input from the microcomputer. Gate 98 also receives the mark signals from pickup 54. Gates 100, 102 each receive the oscillator output on conductor 99.

Counters 104, 106, 108 are each of the same conventional construction. Each includes a counting input, a reset terminal and an output. The counters are labeled to correspond with their counting functions, to be later described, in the apparatus. When one of the counters senses a "0" to "1" transition at its counting input, the count which it displays at its output advances by one. Although each counter 104, 106, 108 is shown having a single output, such being on connections 112, 114, 116, respectively, it is to be appreciated that each such output is actually a plurality of conductors, but is shown otherwise for clarity's sake herein. Such conductors in the output of each counter each has either a "1" or "0" state on it, and the conductors' voltage states, taken together, are representative of a number expressed in binary form. Each time the above-mentioned transition occurs on the counting input in a counter, the number represented on its output advances by one. The reset terminals in the counters are connected to conductors 124, 126, 128, as shown. When a "0" to "1" transition occurs on such a terminal, all of the conductors in the associated output return to "0".

Microcomputer 110 is of conventional construction. It has been found that, although other microcomputers are equally suitable, an Intel 8748 microcomputer is well suited for use herein. Additional conventional circuitry (not shown) is associated with the microcomputer inputs and outputs to provide the required first response time for the microcomputer. Three of the several outputs in microcomputer 110 connect through conductors 118, 120, 122, as shown, with one input each in gates 102, 100, 98, respectively. Conductors 124, 126, 128 connect different other outputs of microcomputer 110 with the reset terminals in counters 104, 106, 108, respectively. The digital count generated by each counter output and appearing on connections 112, 114, 116 are each applied as an input to the computer. Also supplied to the microcomputer are the signals appearing on conductor 73, such signals being from the electronics on platform 40 via brush 64. The remaining input signals fed to microcomputer 110 (on conductor 132) are the mark signals generated by pickup 54. Two remaining outputs of the computer are shown on broken off conductors 134, 136. Such connect with conductors 138, 140, respectively, which are attached to lights 59, 61, respectively. Lights 59, 61 can be turned on-and-off under the control of signals applied to conductors 134, 136 by microcomputer 110.

Figure 8:
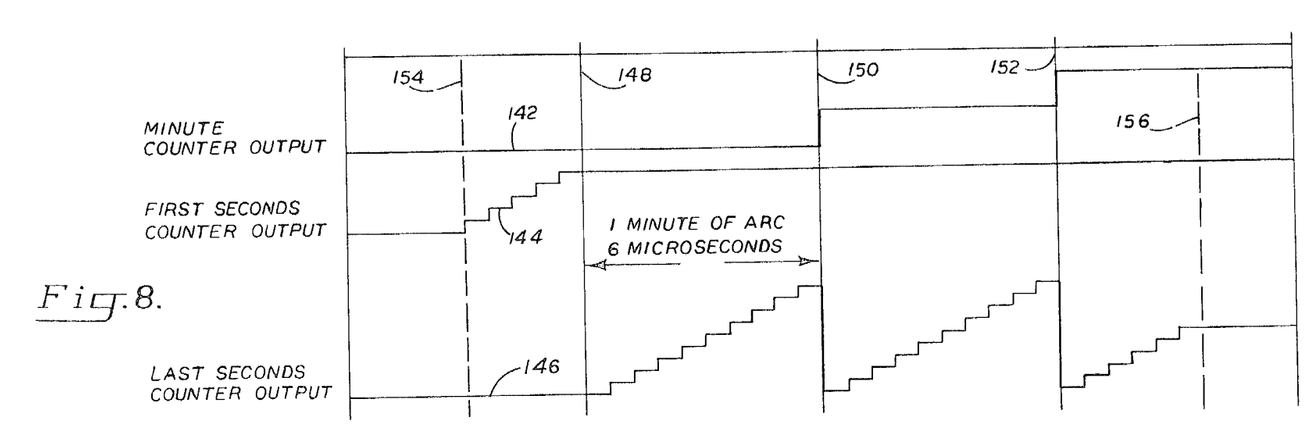
FIG. 8 is a graphic illustration of the operation of part of the circuitry of FIG. 7.

Appearing in FIG. 8 are three graphs 142, 144, 146, which represent the outputs of counters 104, 106, 108, respectively, during one selected angle measurement. It should be appreciated that the vertical scale for the graphs shown in FIG. 8 is not a true representation of the voltages appearing on connections 112, 114, 116 but rather simply a graph in which a vertical increase is intended to illustrate an increase in the binary count of the associated counter. As will later be appreciated more fully, the horizontal scale of the graph indicates time as well as minutes of arc about disc 42. Three of the magnetic marks which are equally spaced about disc 42 are illustrated in FIG. 8 as lines 148, 150, 152. Dashed lines 154, 156 represent the occurrence of reference signals.

Let us examine now the operation of apparatus 10, specifically, the manner in which control circuitry contained therein develops signals representative of an angle presented to the apparatus. Examining again FIGS. 1 and 2, when the apparatus is in its initial condition, prior to beginning an angle measurement, motor 30 drives shaft 32 at approximately 7.7 revolutions per second. In the instant embodiment of the invention, shaft 32 rotates in a counterclockwise direction in FIG. 1. The sensors are mechanically interacting with their respective posts as above-described. However, the control circuitry does not generate signals indicative of the angle presented to the apparatus until receipt of a user-activated input (not shown) which instructs the apparatus to make a measurement.

In order for apparatus 10 to have the highest possible level of accuracy, it is important that the speed at which motor 30 drives shaft 32 be maintained relatively constant. Servo-control circuitry 82 in FIG. 7 monitors the speed at which motor 30 operates and makes adjustments as necessary to maintain the speed of revolution at about 7.7 revolutions per second.

As will be recalled, oscillator 96 provides divider 86 with a conatant-frequency periodic signal having a frequency 10,000,000 Hz. Detector 56 provides divider 84 with a signal having a frequency proportional to the speed of revolution. The value to which each divider, 84, 86, divides its input signal is chosen so that the divided frequencies are equal when disc assembly 34 is rotating at its desired speed. Should that desired speed vary, the frequency of the output of divider 84 varies, and accordingly, comparator 88 generates a signal at its output. Such signal is applied via amplifier 90 to motor 30 in order to correct the speed thereof.

Returning again to FIGS. 1 and 2, when it is desired to present an angle to apparatus 10 for measurement, arm 12 is positioned so that such angle is formed like angle 25. As will be recalled, a reference signal is generated by a sensor when it first encounters one of its associated posts. Line 25a in FIG. 1 is drawn from center 14 to the point at which that encounter, for sensor 38 and post 24, takes place. Likewise, side 25b is drawn from the center to the point at which sensor 36 first detects post 22. As can be observed in FIG. 1, when angle 25 is presented for measurement, a generally equal angle, angle 27 is formed opposite angle 25. Thus, by rotating arm 12, different angles can be presented to the apparatus for measurement.

In the case where the instant invention is utilized in connection with a theodolite, shaft 16 can be mounted on the theodolite's telescope through which a surveyor selects points for angular measurement.

Once angle arm 12 is set, forming the desired angle for measurement, the user activates an input (not shown) which instructs the microcomputer to begin measurement of the angle. Under control of the microcomputer, a "1" voltage is placed on conductor 136, thus turning on light 61. When photocell 67 passes by light 61, the electronics positioned on platform 40 are set in a conventional manner and begin an angle measurement on the next-received reference signal from start sensor 36. As can be seen by the positioning of photocell 67, sensor 36 and light 61, whenever light 61 is turned on, the next post sensed by sensor 36 is post 22. Thus, simply by turning on light 61 apparatus 10 always measures the angle formed between posts 22, 24. In a conventional manner, the electronics on platform 40 develop what might be thought of as a sensor-generated square wave using the reference signals resulting from the interactions of the sensors with posts 22, 24. Such a square wave has its rising edge occurring simultaneously with the reference signal generated at post 22, and its trailing edge occurring simultaneously with the reference signal developed at post 24. The square wave is transmitted via brushes 64 and conductor 73 to the microcomputer in FIG. 7.

Microcomputer 110 in FIG. 7, is preprogrammed to apply selectively "1" and "0" voltage levels to lines 118, 120, 122 upon the occurrence of certain events. When the leading edge of the sensor-generated square wave is sensed by the microcomputer, it places a "1" level on conductor 120. As will be recalled, microcomputer 110 receives mark signals via conductor 132. Upon the first-occurring mark signal after the leading edge of the sensor-generated square wave, the microcomputer returns conductor 120 to a "0" level and maintains that level. Simultaneously, a "1" is placed on conductor 118. Upon the second-occurring mark signal, after the rising edge of the sensor-generated square wave, a "1" is placed on conductor 122. Also, microcomputer 110 is programmed to place momentarily a "1" on conductor 128 for each mark signal occurring during the sensor-generated square wave. Accordingly, counter 108 is reset at each occurring mark signal within the square wave. Gate 98 also receives an input from pickup 54, such input consisting of the mark signals, and gates 100, 102 each also receives an input from oscillator 96. The microcomputer places a "0" on lines 118, 122 when the end of the sensor-generated square wave is sensed.

FIG. 8 provides a graphic illustration of the outputs of the counters, such outputs occurring on connections 112, 114, 116 and being represented by graphs 142, 144, 146, respectively. Each of the graphs is labelled to correspond with the label on its associated counter. Lines 154, 156 represent the rising and falling edges, respectively, of the sensor-generated square wave. As can be seen from the description of the operation thus far, when the motor is driving the disc at its desired speed, the oscillator generates sixty cycles between mark signals generated from adjacent marks on the disc. Thus, the horizontal scale in the graph of FIG. 8 represents both time and minutes of arc about the disc. The output of minute counter 104 is equivalent to the number of marks less one and thus equivalent to minutes of arc less one minute occurring within the sensor-generated square wave. Since there are sixty seconds of arc within one minute of arc, the output of the first seconds counter 106 represents the number of seconds occurring between the start of the square wave and the first mark occurring after the rising edge of the square wave. The output of last seconds counter 108 represents the number of seconds between the last-occurring mark within the square wave and the end of the square wave. Thus, at the end of the sensor-generated square wave, the counts on each of the counters are "frozen" under control of the microcomputer, such frozen count represents the complement of the total angle of arc of the selected angle in minutes and seconds. For the sake of clarity in the graph of FIG. 8, vertical increases in the graph represent more than one advancing count for each seconds counter. Each vertical increase in the graph representing the minute counter output represents one advance in such count. The computer is programmed to interpret the count on each of the counters after the sensor-generated square wave, and through conventional digital display equipment (not shown) the same is placed in human readable form.

After angle 25 has been measured, the computer is programmed to turn on light 59, the same interacting with photocell 67 as it next passes light 59. The next post which the sensor 36 sees after the interaction of light 59 with photocell 67 is always post 20, thus causing the apparatus to measure angle 27 in the same manner as above-described. As can be seen by the description of the operation thus far, sensor 36 always generates the reference signal which corresponds with the rising edge of the sensor-generated square wave. Likewise, sensor 38 always generates the reference signal associated with the trailing edge of such square wave. A similar count as that illustrated in FIG. 8 is stored at the counters output after angle 27 has been measured. If the machining of all the rotational parts in apparatus 10 had been done without error, vertical angles 25, 27 formed by the post as shown in FIG. 1 would each be equal and would generate an equal count. However, it is not possible to machine the parts completely without error and typically slight differences occur. Thus, the measurement obtained for each angle is averaged, producing a more accurate count than if only one or the other is measured. This is so because any off-axis errors which would generate a smaller reading on one angle and a larger on the other are cancelled out by the averaging process.

Although not illustrated, counters 106, 108 and gates 98, 100, 102, herein referred to as resolving circuitry, could be replaced by a conventional phase-locked loop having its output applied to counter 104. The phase-locked loop senses the mark signals and develops a periodic waveform having sixty periods between each signal so sensed. Thus, the total count is computed in seconds, such count being generated by the output of the phase-locked loop. As in the embodiment of FIG. 7, the rising and trailing edges of the sensor-generated square wave are used to define the period during which a count is made.

The embodiment of the invention, a portion of which is shown in FIGS. 5-6 operates is essentially the same manner. However, meniscuses 76, 78 take the place of fixed posts 20, 22 in the first-described embodiment of the invention. Accordingly, in a vertical plane, measurements of the angle presented by arm 12 can be made with respect to a gravity-formed datum, that being meniscuses 76, 78.

Thus, an advantage of the above-described embodiment is that variations in speed of the electric motor effect only the second count inasmuch as the minute count is generated directly from the marks on the disc. Since the speed of the rotation of the disc is servo controlled with the oscillator which is used to generate the second count, the above-described embodiment of the invention allows accurate representation of angular measurements to within less than one second of arc.

While a preferred embodiment of the invention has been described, it is appreciated that variations and modifications may be made without parting from the spirit of the invention.

It is claimed and desired to secure by Letters Patent:
1. An apparatus for measuring angles comprising,
   (a) a disc having a circular track of marks on one surface, such tracks being concentric with said disc,
   (b) a means for rotating said disc about its axis,
   (c) a mark sensor located adjacent said disc for sensing said marks, said sensor generating a mark signal for each mark passing thereby,
   (d) angle-to-signal conversion means including a pair of angle-input means located adjacent said disc, one of said angle-input means being fixed relative to the rotary disc and the other of said angle-input means being mounted for rotation coaxial with but independently of said rotary disc for establishing with said fixed angle-input means an angle to be measured, said conversion means further including reference means mounted for rotation with said disc and arranged for interaction with said pair of angle-input means so that a reference signal is generated each time said reference means passes each angle-input means of the pair, and
   (e) control circuitry operatively interconnected with said conversion means and said mark sensor, said circuitry being operable to count mark signals occurring between selected reference signals.
2. The apparatus of claim 1, wherein said marks are magnetic.

3. The apparatus of claims 1 or 2, wherein said marks are equally spaced about said disc.

4. The apparatus of claim 1, wherein said control circuitry includes resolving circuitry for generating a periodic waveform between each of said mark signals and for counting the cycles of such periodic waveform.

5. The apparatus of claim 4, wherein said resolving circuitry includes an oscillator and two counters operatively connected therewith, one of said counters being adapted for counting oscillator-generated signals occurring between a selected reference signal and the next-occurring mark signal, and the other counter being adapted for counting oscillator-generated signals occurring between each successive mark signal until the occurrence of the next selected reference signal.

6. The apparatus of claim 4, wherein said resolving circuitry includes a phase-locked loop and a counter operatively connected therewith, said loop being responsive to said mark signals and said counter counting the loop output occurring between selected reference signals.

7. The apparatus of claim 1, which further includes servo control means operatively connected to said disc and said rotating means, said servo control means being operable to regulate the speed of the rotating means.

8. The apparatus of claim 1 which further includes a second pair of angle-input means located adjacent said disc, one of the second pair of angle-input means being fixed relative to the rotary disc substantially 180° from the said fixed one of the first pair of angle-input means and the other of the second pair of angle-input means being mounted for rotation with but substantially 180° from the said other of the first pair of angle-input means, said reference means being capable of interaction with said second pair of angle-input means so that a reference signal is generated each time said reference means passes each of said second pair of angle-input means, and wherein said control circuitry is further operable to count the mark signals occurring between selected reference signals generated by reference means interaction with said second angle-input means and to average such second mark signal count with said first-mentioned mark signal count.

9. The apparatus of claims 1 or 8, wherein said reference means comprises at least one rotating sensor, such sensor including a radiation source and a radiation detector, oriented one toward the other, defining a space therebetween, and each of said angle-input means includes a past oriented so that during disc rotation said pin passes through such defined space, thereby causing said detector to generate a reference signal.

10. The apparatus of claim 7 wherein the rotating means comprises an electric motor, and the servo control means includes a plurality of equally spaced openings through a disc mounted for coaxial rotation with the rotary disc, light detector means associated with said disc openings and operable to provide an output frequency proportional to the speed of rotation of the disc, oscillator means for providing a reference frequency output, and frequency comparator means having one input connected to the output of the light detector means, a second input connected to the output of the oscillator means, and an output connected to the electric motor, said output being a voltage that is proportional to the difference between the frequencies of the light detector means and oscillator means.

* * * * *